US006276168B1

United States Patent
Fidkowski et al.

(10) Patent No.: US 6,276,168 B1
(45) Date of Patent: Aug. 21, 2001

(54) PURIFICATION OF NITROGEN TRIFLUORIDE BY CONTINUOUS CRYOGENIC DISTILLATION

(75) Inventors: Zbigniew Tadeusz Fidkowski, Macungie; John Frederick Cirucci, Schnecksville; Rakesh Agrawal, Emmaus; Shyam Ramchand Suchdeo, Wescosville; Steven Ray Auvil, Macungie, all of PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 09/566,075

(22) Filed: May 8, 2000

(51) Int. Cl.[7] .................................................. F25J 1/00
(52) U.S. Cl. ............................ 62/625; 62/630; 62/918
(58) Field of Search .............................. 62/918, 625, 630

(56) References Cited

U.S. PATENT DOCUMENTS

| 5,069,887 | 12/1991 | Suenaga et al. | 423/240 |
| 5,183,647 | 2/1993 | Harada et al. | 423/239 |
| 5,502,969 | 4/1996 | Jin et al. | 62/11 |
| 5,626,023 | 5/1997 | Fisher et al. | 62/625 |
| 5,771,713 | 6/1998 | Fisher | 62/625 |
| 5,779,863 | 7/1998 | Ha et al. | 203/74 |
| 5,832,746 | 11/1998 | Nagamura | 62/623 |
| 6,047,560 | * 4/2000 | Nishimura et al. | 62/918 |

FOREIGN PATENT DOCUMENTS

| 9924358 | 5/1999 | (WO) | C01B/21/083 |

* cited by examiner

Primary Examiner—Ronald Capossela
(74) Attorney, Agent, or Firm—Geoffrey L. Chase

(57) ABSTRACT

The process recovers NF3 from a multicomponent fluid containing NF3, one or more components less volatile than NF3, and one or more components more volatile than NF3. The process uses a first distillation column and a second distillation column, each distillation column having a top and a bottom. The process includes the following steps: feeding the multicomponent fluid to the first distillation column at a first feed location below the top of the first distillation column; feeding a cryogenic liquid to the first or second distillation column adjacent the top of the first or second distillation column; withdrawing a mixture containing NF3 from the first distillation column; feeding the mixture to the second distillation column at a second feed location; separating NF3 from the mixture in the second distillation column; and removing a stream of NF3 from the second distillation column.

9 Claims, 4 Drawing Sheets

PURIFICATION OF NITROGEN TRIFLUORIDE BY CONTINUOUS CRYOGENIC DISTILLATION

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention pertains to the separation and recovery of fluorine compounds from multicomponent fluids containing fluorine compounds, and in particular to the purification of nitrogen trifluoride ($NF_3$) by continuous cryogenic distillation.

Fluorine compounds are widely used in the manufacture of semiconductors. These compounds can be costly and detrimental to the environment, if released. Nitrogen trifluoride is used as an etching gas and a chamber cleaning gas.

In the process of manufacturing nitrogen trifluoride a gas mixture is created that contains nitrogen trifluoride, nitrogen, oxygen, nitrous oxide, hydrogen fluoride and other components. Nitrogen and oxygen are more volatile than nitrogen trifluoride, while nitrous oxide and hydrogen fluoride are less volatile and may form solids at low temperature and higher concentrations. This gas mixture may be then purified by cryogenic distillation to obtain nitrogen trifluoride after removal of bulk levels of active fluorides and heavy components, if high purity nitrogen trifluoride is required.

Batch distillation is a cost-effective method of purifying relatively small quantities of product, because it is simple and offers considerable operating flexibility. This economy is lost when large quantities of product must be purified. This is because batch distillation requires storage for the feed and intermediate product between the production batches. Storage of large amounts of gases is troublesome. It can be accomplished either by compression into storage vessels or by liquefaction. Both methods are expensive due to the capital cost of large storage vessels and the operating costs associated with frequent batch transfers.

Batch processing also is a source of environmentally detrimental releases of fluorine compounds during frequent transfers, process line purges, and storage vessel ventings.

Cryogenic distillation of fluorine compounds with the addition of a wash liquid is disclosed in U.S. Pat. Nos. 5,502,969 (Jin, et al.), 5,626,023 (Fisher, et al.) and 5,771,713 (Fisher). The wash liquid is added to absorb fluorine compounds from a carrier gas or to prevent some components from solidifying. One (or two or three) Cryogenic distillation column(s) is used to separate highly volatile fluorine compounds from the wash liquid. (Alternatively, the subsequent columns separate less volatile fluorine compounds either from wash liquid or from residual heavy components.) All of these distillation systems involve batch processing.

A continuous process for ultra-high purity nitrogen trifluoride production is disclosed in U.S. Pat. No. 5,832,746 (Nagamura). The process comprises pressurizing a nitrogen trifluoride feed gas; eliminating moisture, $CO_2$ and partially $CF_4$ from the feed gas; cooling the feed gas down and passing it through a cold adsorber to eliminate $N_2F_2$, $N_2F_4$, $N_2O$ and further reduce $CF_4$ content; liquefying the feed gas in a bottom reboiler/condenser of a medium pressure distillation column; and using the supplied heat to separate the heavy components of the feed gas in that column. The resulting mixture is then passed to a low pressure distillation column, heat integrated with the medium pressure distillation column by means of a second reboiler/condenser, where it is distilled to provide ultra-high purity $NF_3$ as a bottom product and a waste vapor overhead. This process could be relatively expensive because of the need for pressurization of the $NF_3$ feed gas. The process also could be difficult to control because of the double heat integration (between the feed gas and the medium pressure distillation column and between the medium and the low pressure distillation columns).

In all of these prior art distillation processes, reflux is provided by condensing a portion of an overhead vapor against cryogenic liquid, for example liquid nitrogen. This requires the use of a condenser and associated control instruments.

Other methods of purification of $NF_3$ feed gas from certain components are disclosed in the patent literature. In U.S. Pat. No. 5,069,887 (Suenaga, et al.) an adsorption process on a molecular sieve is used to separate $NF_3$ from $CF_4$. In U.S. Pat. No. 5,183,647 (Harada, et al.) conditions that favor chemical decomposition of $N_2F_2$ from $NF_3$ feed gas are disclosed. U.S. Pat. No. 5,779,863 (Ha, et al.) discloses a method for separating and purifying perfluorocompounds (PFC's), including $NF_3$, using a distillation column system comprising three or four distillation columns.

It is desired to have a safe and economical, continuous cryogenic distillation process for purification of nitrogen trifluoride.

It is further desired to have such a process which accomplishes the desired separation with maximum recovery, without any releases of fluorine compounds to the environment.

It is still further desired to have a process for recovering nitrogen trifluoride from multicomponent fluids which overcomes the difficulties and disadvantages of the prior art to provide better and more advantageous results.

BRIEF SUMMARY OF THE INVENTION

The present invention is a process for recovering nitrogen trifluoride ($NF_3$) from a multicomponent fluid containing $NF_3$ (a feed stream) by continuous distillation.

A first embodiment of the invention is a process for recovering $NF_3$ from a multicomponent fluid containing $NF_3$ having a first volatility, one or more components less volatile than $NF_3$ and one or more components more volatile than $NF_3$. The process uses a first distillation column and a second distillation column, each distillation column having a top and a bottom. The process comprises multiple steps. The first step is to feed the multicomponent fluid to the first distillation column at a first feed location. The second step is to feed a cryogenic liquid to the first distillation column at a location above the first feed location. The third step is to remove the components more volatile than $NF_3$ from the top of the first distillation column. The fourth step is to withdraw a mixture containing $NF_3$ and the components less volatile than $NF_3$ from the first distillation column at a location below the first feed location. The fifth step is to feed the mixture to the second distillation column at a second feed location. The sixth step is to separate $NF_3$ from the mixture in the second distillation column. The seventh step is to remove a stream of $NF_3$ from the top of the second distillation column.

In a variation of the first embodiment, the process includes an additional step. The additional step is to remove from the bottom of the second distillation column a stream containing the components less volatile than $NF_3$.

A second embodiment has the same multiple steps as the first embodiment, but includes three additional steps. The first additional step is to withdraw a liquid stream from the second distillation column at or near the second feed location. The second additional step is to feed the liquid stream to the first distillation column at a location below the first feed location. The third additional step is to remove from the bottom of the first distillation column a stream containing the components less volatile than $NF_3$.

A third embodiment is a process for recovering $NF_3$ from a multicomponent fluid containing $NF_3$ having a first volatility, one or more components less volatile than $NF_3$, and one or more components more volatile than $NF_3$. The process uses a first distillation column and a second distillation column, each distillation column having a top and a bottom. The process comprises multiple steps. The first step is to feed the multicomponent fluid to the first distillation column at a first feed location. The second step is to remove the components less volatile than $NF_3$ from the bottom of the first distillation column. The third step is to withdraw a mixture containing $NF_3$ and said components more volatile than $NF_3$ from the first distillation column in a location above the first feed location. The fourth step is to feed the mixture to the second distillation column at a second feed location. The fifth step is to feed a cryogenic liquid to the second distillation column at a location above the second feed location. The sixth step is to remove the components more volatile than $NF_3$ from the top of the second distillation column. The seventh step is to remove a stream of $NF_3$ from the bottom of the second distillation column.

A fourth embodiment of the invention is a process for recovering $NF_3$ from a multicomponent fluid containing $NF_3$ having a first volatility, one or more components less volatile than $NF_3$, and one or more components more volatile than $NF_3$. The process uses a first distillation column and a second distillation column, each distillation column having a top and a bottom. The process comprises multiple steps. The first is to feed the multicomponent fluid to the first distillation column at a first feed location. The second step is to feed a cryogenic liquid to the first distillation column at a second feed location above the first feed location. The third step is to remove the components more volatile than $NF_3$ from the top of the first distillation column. The fourth step is to withdraw a mixture containing $NF_3$ from the first distillation column at an intermediate location between the first feed location and the second feed location. The fifth step is to feed the mixture to the second distillation column at or near the top of the second distillation column. The sixth step is to remove a vapor stream from the top of the second distillation column. The seventh step is to feed the vapor stream to the first distillation column at a location above the first feed location. The eighth step is to remove a stream of $NF_3$ from the bottom of the second distillation column. The ninth step is to remove the components less volatile than $NF_3$ from the bottom of the first distillation column.

A fifth embodiment is a process for recovering $NF_3$ from a multicomponent fluid containing $NF_3$ having a first volatility, one or more components less volatile than $NF_3$, and one or more components more volatile than $NF_3$. The process uses a first distillation column and a second distillation column, each distillation column having a top and a bottom. The process comprises multiple steps. The first step is to feed the multicomponent fluid to the first distillation column at a first feed location below the top of the first distillation column. The second step is to feed a cryogenic liquid to the first or second distillation column adjacent the top of the first or second distillation column. The third step is to withdraw a mixture containing $NF_3$ from the first distillation column. The fourth step is to feed the mixture to the second distillation column at a second feed location. The fifth step is to separate $NF_3$ from the mixture in the second distillation column. The sixth step is to remove a stream of $NF_3$ from the second distillation column.

There are several variations of the various embodiments of the invention. For example, the cryogenic liquid may be selected from the group consisting of liquid nitrogen, liquid argon, liquid helium and mixtures thereof. In one variation, the concentration of $NF_3$ in the multicomponent fluid is greater than about 5 mole %. In another variation, the components less volatile than $NF_3$ include nitrogen oxide and/or hydrogen fluoride, and the components more volatile than $NF_3$ include nitrogen and/or oxygen.

BRIEF DESCRIPTION OF SEVERAL VIEWS OF THE DRAWINGS

The invention will be described by way of example with reference to the accompanying drawings in which.

DETAILED DESCRIPTION OF THE INVENTION

Figure 1:
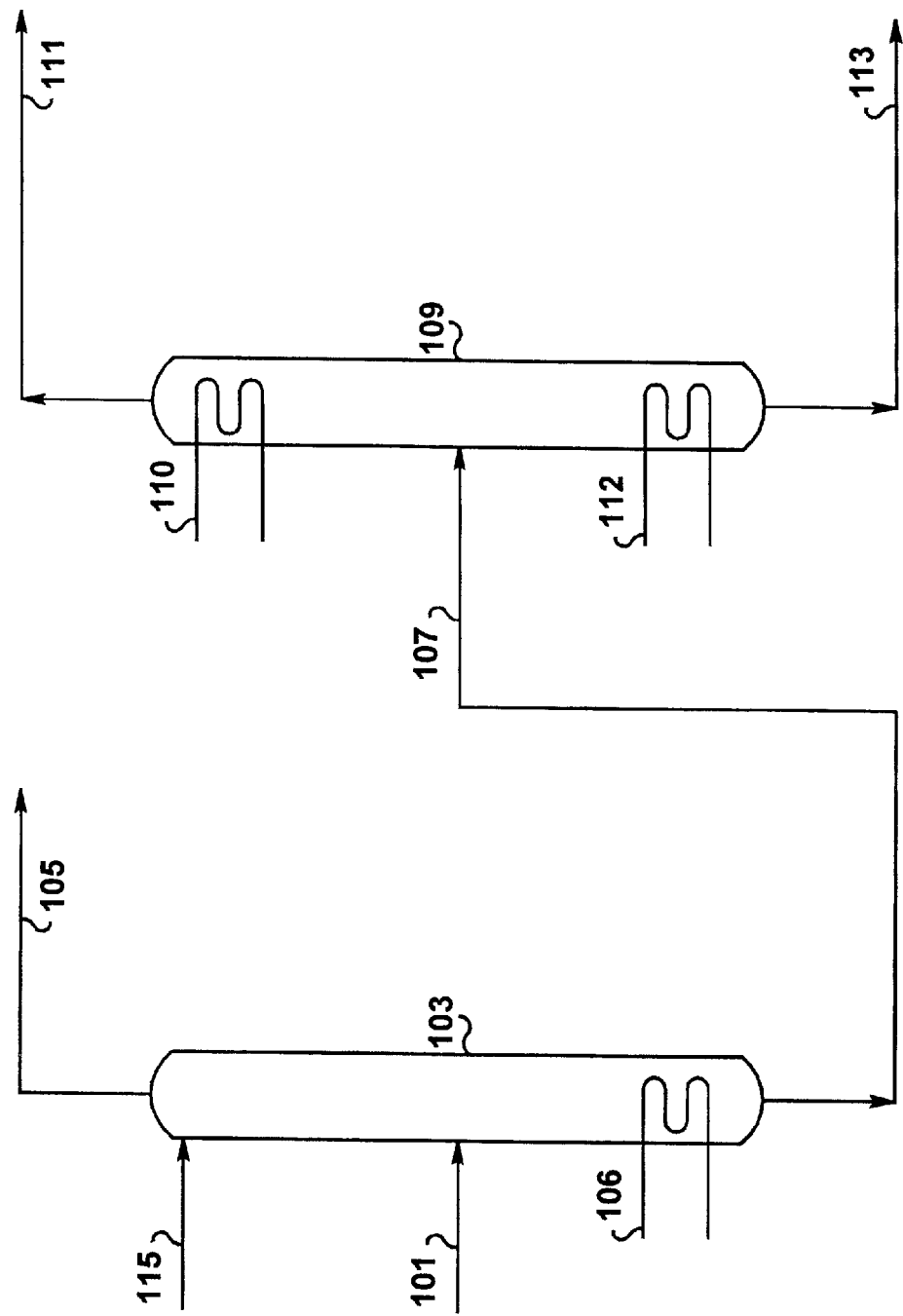
FIG. 1 is a schematic diagram of an embodiment of the present invention.

The invention is a process for recovering $NF_3$ from a multicomponent fluid containing $NF_3$ (a feed stream) by continuous distillation.

The $NF_3$ feed stream containing components more volatile than $NF_3$ and less volatile components, after being cooled down to cryogenic temperature and optionally condensed, is introduced to a first distillation column of a distillation column system compromising at least two distillation columns, wherein a liquid cryogenic stream (e.g., liquid nitrogen) also is introduced, and (i) components more volatile than $NF_3$ are removed from the top of the first distillation column and a mixture containing $NF_3$ and less volatile components withdrawn from the first distillation column below the feed location is passed to a second distillation column, where $NF_3$ is removed as a top product or (ii) components less volatile than $NF_3$ are removed from the bottom of the first distillation column and a mixture containing $NF_3$ and more volatile components withdrawn from the first distillation column above the feed location is passed to a second distillation column, where $NF_3$ is removed as a bottom product.

Examples of the more volatile components in the $NF_3$ feed stream are nitrogen and/or oxygen; examples of the less volatile components are nitrous oxide and hydrogen fluoride. Any less volatile impurity which has a melting temperature above the operating temperature of the distillation system must be reduced in concentration in the feed stream to a level which ensures that it is below its solubility limit at all points in the distillation system. Typical methods for reducing the concentration of less volatile impurities include absorption and adsorption. For example, water is removed from the $NF_3$ feed stream prior to cooling it to cryogenic temperature. Generally, water is removed by adsorption over a suitable adsorbent. In the adsorption process the content of $N_2O$ and the content of HF also are reduced.

While there is no restriction on the concentration of $NF_3$ in the $NF_3$ feed stream, for the distillation process to be economically attractive, a higher concentration of $NF_3$ in the $NF_3$ feed stream is preferred. Generally, the concentration of $NF_3$ in the $NF_3$ feed stream will be greater than 5 mole %, preferably greater than 10 mole %, and more preferably greater than 30 mole %.

The introduction of a cryogenic liquid, such as liquid nitrogen, provides liquid reflux to a distillation column. (Other cryogenic liquids, such as argon, helium, or mixtures thereof may be used instead of liquid nitrogen). Liquid nitrogen generally is introduced to the top of the distillation column. Liquid nitrogen is introduced to the distillation column where components more volatile than $NF_3$ are rejected, i.e., the vapor leaving from the top of the distillation column is lean in $NF_3$ but rich in the more volatile components.

Thus, in option (i), where components more volatile than $NF_3$ are removed from the top of the first distillation column, liquid nitrogen is introduced to the top of the first distillation column. In option (ii), when the more volatile components are removed from the top of the second distillation column, then liquid nitrogen is introduced to the top of the second distillation column. Similarly, in option (ii), when the more volatile components are removed from the top of the first distillation column, then liquid nitrogen is introduced to the top of the first distillation column. In the preferred mode, liquid nitrogen is introduced directly to the top of the distillation column and a condenser is not used.

An embodiment of the present invention according to option (i) is shown in FIG. 1. A feed stream 101 is introduced to a first distillation column 103, where the feed stream is separated into an overhead vapor stream 105, containing components that are more volatile than $NF_3$, and a bottom product stream 107, containing $NF_3$ and less volatile components. Stream 107 is withdrawn from the first distillation column 103 as a liquid, a vapor, or a two-phase stream. Stream 107 then is introduced to a second distillation column 109, where it is separated into a pure $NF_3$ top product stream 111 and a bottom product stream 113 containing a solution of less volatile components in $NF_3$. The pure $NF_3$ top product stream 111, or its portion, may be withdrawn as a vapor or a liquid. Stream 113 may be recycled back to purification steps (not shown), such as an adsorption process, upstream of the distillation system.

The first distillation column 103 has a reboiler 106, while the second distillation column 109 has a reboiler 112 and a condenser 110. Preferably, the first distillation column 103 does not have a condenser and a liquid nitrogen stream 115 is introduced directly at the top of the first distillation column 103 as reflux. Optionally, the first distillation column 103 may have a condenser and the liquid nitrogen stream 115, instead of going directly to the top of the first distillation column 103 as reflux, may be used as a cooling medium in this optional condenser. However, this optional method usually is not preferred.

Figure 2:
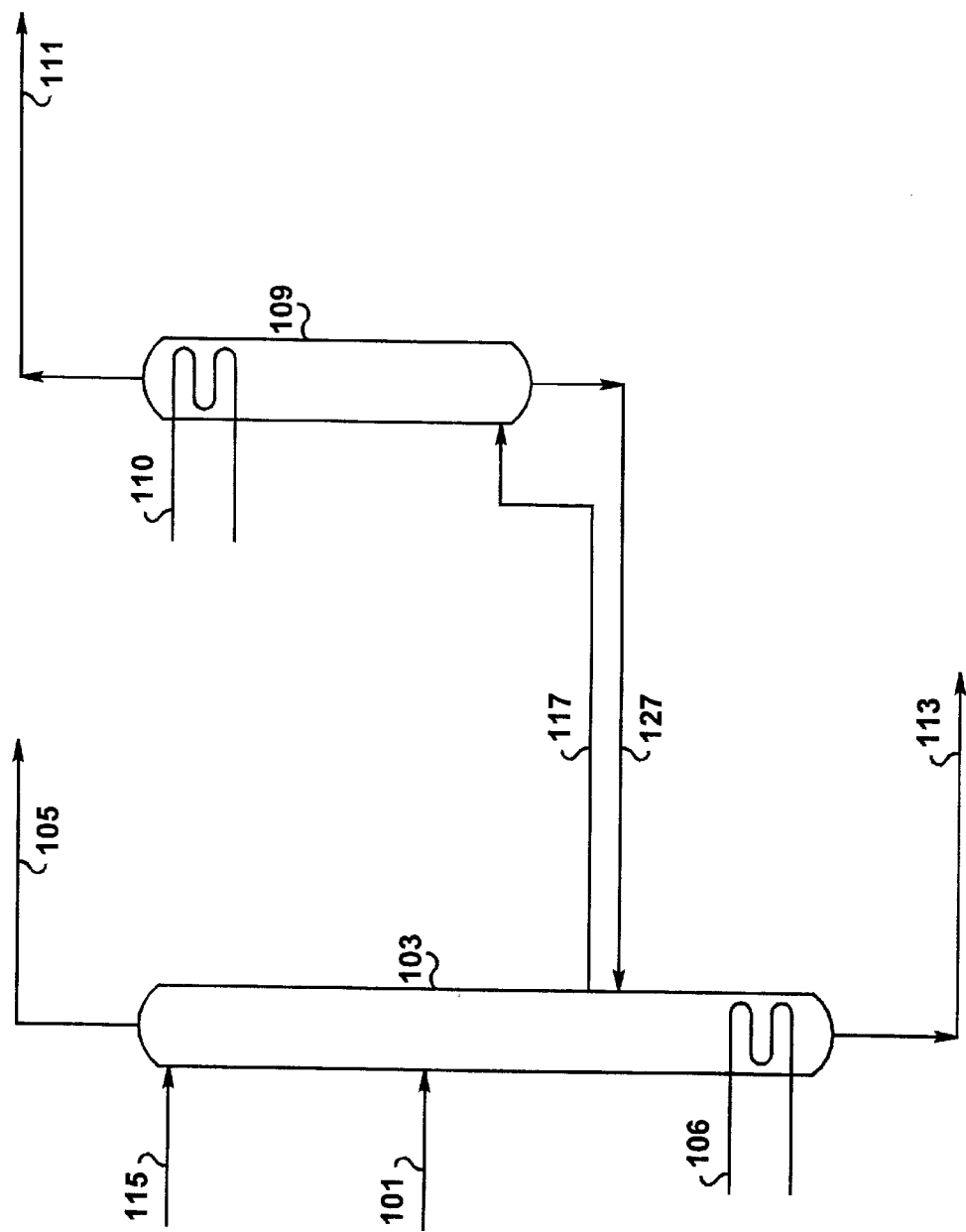
FIG. 2 is a schematic diagram of a second embodiment of the present invention.

Another embodiment of the present invention according to option (i) is shown in FIG. 2. It differs from the previous embodiment in that the bottom product stream 113, containing the components that are less volatile than $NF_3$, is now withdrawn from the bottom of the first distillation column 103 (rather than the second distillation column 109). Stream 113 may be recycled back to purification steps (not shown), such as an adsorption process, upstream of the distillation system. A feed stream 117 to the second distillation column 109 is now withdrawn from the first distillation column 103 as a side stream. The withdrawal point of feed stream 117 is below the location of feed stream 101. The first, distillation column 103 has a reboiler 106. The second distillation column 109 has a condenser 110 but does not have a reboiler. A bottom liquid stream 127 from the second distillation column 109 is returned to the first distillation column 103. Preferably, a liquid nitrogen stream 115 is introduced directly at the top of the first distillation column 103 as reflux. Optionally, the first distillation column 103 may have a condenser (not shown) and the liquid nitrogen stream 115, instead of going directly to the top of the first distillation column 103 as reflux, may be used as a cooling medium in this optional condenser. However, this optional method usually is less preferred.

Figure 3:
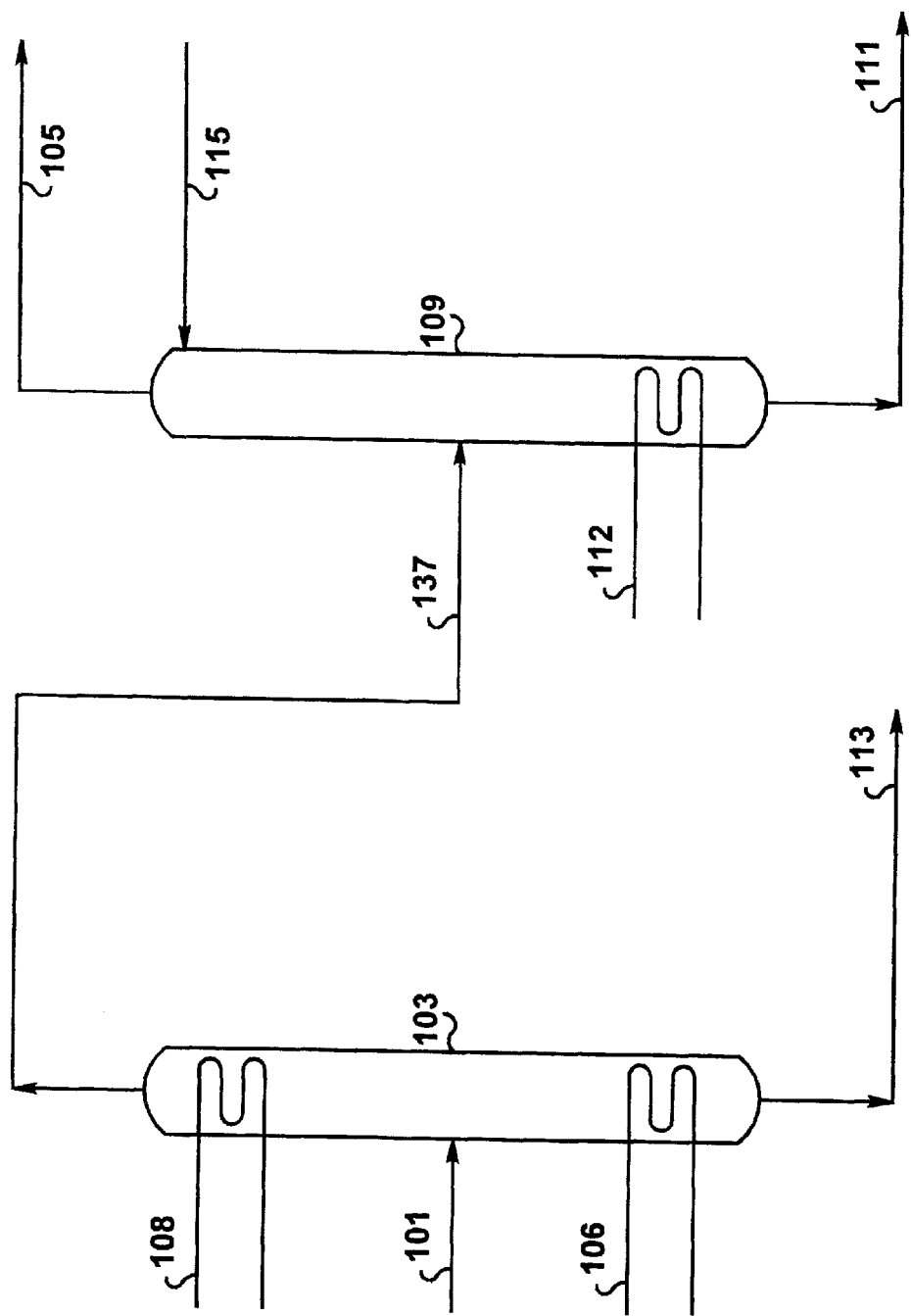
FIG. 3 is a schematic diagram of a third embodiment of the present invention.

An embodiment of the present invention according to option (ii) is shown in FIG. 3. A feed stream 101 is introduced to a first distillation column 103, where the feed stream is separated into an overhead product stream 137, containing $NF_3$ and all the components that are more volatile than $NF_3$, and a bottom product stream 113, containing $NF_3$ and less volatile components. Stream 113 may be recycled back to purification steps (not shown), such as an adsorption process, upstream of the distillation system. Stream 137 may be withdrawn from the first distillation column 103 as a vapor, a liquid, or a two-phase stream. Stream 137 is introduced to the second distillation column 109, where it is separated into an overhead stream 105, containing components that are more volatile than $NF_3$ and a pure $NF_3$ bottom product stream 111. Stream 111 can be withdrawn as a liquid or a vapor. The first distillation column 103 has a reboiler 106 and a condenser 108. The second distillation column 109 has a reboiler 112. Preferably, a liquid nitrogen stream 115 is introduced directly at the top of the second distillation column 109 as reflux. Optionally, the second distillation column 109 may contain a condenser (not shown) and the liquid nitrogen stream 115, instead of going directly to the top of the second distillation column 109 as reflux, may be used as a cooling medium in this optional condenser. However, this method usually is less preferred.

Figure 4:
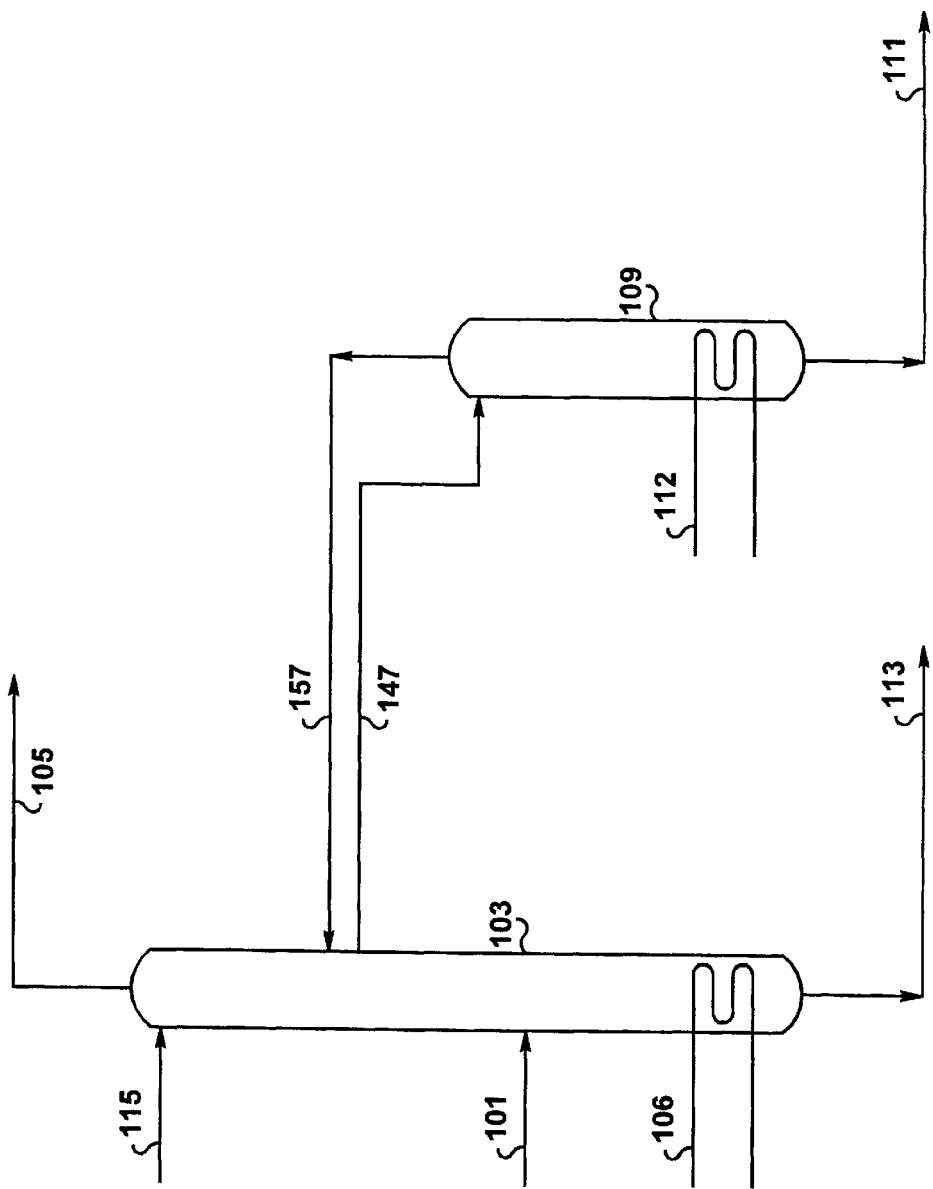
FIG. 4 is a schematic diagram of a fourth embodiment of the present invention.

Yet another embodiment of the present invention according to option (ii) is shown in FIG. 4. It differs from the previous embodiment (FIG. 3) in that the overhead stream 105, containing the components that are more volatile than $NF_3$, is now withdrawn from the top of the first distillation column 103. A feed stream 147 to the second distillation column 109 is withdrawn from the first distillation column 103 as a side stream. The withdrawal point of feed stream 147 is situated above the location of feed stream 101. First distillation column 103 has a reboiler 106 and the second distillation column 109 has a reboiler 112, but neither has a condenser. A top vapor stream 157 from the second distillation column 109 is returned to the first distillation column 103. Preferably, a liquid nitrogen stream 115 is introduced directly at the top of the first distillation column 103 as a reflux and this column does not have a condenser. Optionally, the first distillation column 103 may contain a condenser (not shown) and the liquid nitrogen stream 115, instead of going directly to the first distillation column 103 as reflux, may be used as a cooling medium in this optional condenser. However, this method usually is less preferred.

An example of a computer simulation for the embodiment shown in FIG. 4 is given in Table 1. Each column section contains either trays or packing equivalent to eight (8) theoretical stages.

TABLE 1

An example of a computer simulation for the embodiment shown in FIG. 4.

| Stream | Flow lb-mole/h | Temperature F | Pressure psia | $N_2O$ mole fract. | $NF_3$ mole fract. | $O_2$ mole fract | $N_2$ mole fract. |
|---|---|---|---|---|---|---|---|
| 101 | 1.00 | −315 | 33.0 | 5.6E−5 | 0.2241 | 0.0456 | 0.7303 |
| 105 | 3.95 | −308 | 30.0 | 0 | 0 | 0.0115 | 0.9885 |
| 111 | 0.22 | −179 | 31.3 | 0 | 1.000 | 0 | 0 |
| 113 | 0.005 | −205 | 31.4 | 0.0100 | 0.9683 | 0.0027 | 0.0190 |
| 115 | 3.17 | −306 | 35.0 | 0 | 0 | 0 | 1.000 |
| 147 | 1.01 | −269 | 30.9 | 0 | 0.6472 | 0.3040 | 0.0488 |
| 157 | 0.79 | −197 | 30.9 | 0 | 0.5493 | 0.3884 | 0.0623 |

The present invention is of value because it presents a continuous distillation process which is more friendly for the environment than batch distillation processes and provides economies for larger scale production. In the batch distillation process the feed and intermediate products have to be stored until they are used. When the production scale increases significantly, storage in multiple vessels is involved and transferring of large amounts of material from multiple storage tanks is laborious and creates more opportunities for uncontrolled releases or spills to the environment. Also, frequent start-ups and shut-downs of a batch distillation column creates more fractions of materials that do not meet product specifications and need to be transferred to intermediate storage and recycled and could easily be released to the environment.

The present invention presents a safe and economical, continuous cryogenic distillation process for purification of nitrogen trifluoride. The desired separation is accomplished with maximum recovery and without any releases of fluorine compounds to the environment. The use of direct liquid nitrogen reflux prevents nitrogen trifluoride from being released to the environment. Also, since a stream containing heavy components and $NF_3$ can be continuously recycled back to the process, $NF_3$ is not released to the environment. The operability of the process is superior to that of prior art processes.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

What is claimed is:

1. A process for recovering $NF_3$ from a multicomponent fluid containing $NF_3$ having a first volatility, one or more components less volatile than $NF_3$, and one or more components more volatile than $NF_3$, said process using a first distillation column and a second distillation column, each distillation column having a top and a bottom, comprising the steps of:
   feeding said multicomponent fluid to said first distillation column at a first feed location;
   feeding a cryogenic liquid to said first distillation column at a location above said first feed location;
   removing said components more volatile than NF3 from the top of said first distillation column;
   withdrawing a mixture containing NF3 and said components less volatile than NF3 from said first distillation column at a location below said feed location;
   feeding said mixture to said second distillation column at a second feed location;
   separating NF3 from said mixture in said second distillation column; and
   removing a stream of NF3 from the top of said second distillation column.

2. A process as in claim 1, comprising the further step of removing from the bottom of said second distillation column a stream containing said components less volatile than NF3.

3. A process as in claim 1, comprising the further steps of:
   withdrawing a liquid stream from said second distillation column at or near said second feed location;
   feeding said liquid stream to said first distillation column at a location below said first feed location; and
   removing from the bottom of said first distillation column a stream containing said components less volatile than NF3.

4. A process for recovering NF3 from a multicomponent fluid containing NF3 having a first volatility, one or more components less volatile than NF3, and one or more components more volatile than NF3, said process using a first distillation column and a second distillation column, each distillation column having a top and a bottom, comprising the steps of:
   feeding said multicomponent fluid to said first distillation column at a first feed location;
   removing said components less volatile than NF3 from the bottom of said first distillation column;
   withdrawing a mixture containing NF3 and said components more volatile than NF3 from said first distillation column at a location above said first feed location;
   feeding said mixture to said second distillation column at a second feed location;
   feeding a cryogenic liquid to said second distillation column at a location above said second feed location;
   removing said components more volatile than NF3 from the top of said second distillation column; and
   removing a stream of NF3 from the bottom of said second distillation column.

5. A process for recovering NF3 from a multicomponent fluid containing NF3 having a first volatility, one or more components less volatile than NF3, and one or more components more volatile than NF3, said process using a first distillation column and a second distillation column, each distillation column having a top and a bottom, comprising the steps of:
   feeding said multicomponent fluid to said first distillation column at a first feed location;
   feeding a cryogenic liquid to said first distillation column at a second feed location above said first feed location;
   removing said components more volatile than NF3 from the top of said first distillation column;

withdrawing a mixture containing NF3 from said first distillation column at an intermediate location between said first feed location and said second feed location;

feeding said mixture to said second distillation column at or near the top of said second distillation column;

removing a vapor stream from the top of said second distillation column;

feeding said vapor stream to said first distillation column at a location above the first feed location;

removing a stream of NF3 from the bottom of said second distillation column; and removing said components less volatile than NF3 from the bottom of said first distillation column.

6. A process for recovering NF3 from a multicomponent fluid containing NF3 having a first volatility, one or more components less volatile than NF3, and one or more components more volatile than NF3, said process using a first distillation column and a second distillation column, each distillation column having a top and a bottom, comprising the steps of:

feeding said multicomponent fluid to said first distillation column at a first feed location below the top of said first distillation column;

feeding a cryogenic liquid to the top of a distillation column selected from the group consisting of said first or second distillation column;

withdrawing a mixture containing NF3 from said first distillation column;

feeding said mixture to said second distillation column at a second feed location;

separating NF3 from said mixture in said second distillation column; and removing a stream of NF3 from said second distillation column.

7. A process as in claim 6, wherein said cryogenic liquid is selected from the group consisting of liquid nitrogen, liquid argon, liquid helium and mixtures thereof.

8. A process as in claim 6, wherein the concentration of NF3 in said multicomponent fluid is greater than about 5 mole %.

9. A process as in claim 6, wherein said components less volatile than NF3 include nitrous oxide and/or hydrogen fluoride, and wherein said components more volatile than NF3 include nitrogen and/or oxygen.

* * * * *